(12) United States Patent
Woodbury, II

(10) Patent No.: US 9,822,923 B2
(45) Date of Patent: Nov. 21, 2017

(54) METHODS AND APPARATUS FOR A SUSPENSION SYSTEM

(71) Applicant: Suspension Systems Technologies, LLC, Chandler, AZ (US)

(72) Inventor: William E. Woodbury, II, San Tan Valley, AZ (US)

(73) Assignee: Suspension Systems Technologies, LLC, Chandler, AZ (US)

( * ) Notice: Subject to any disclaimer, the term of this patent is extended or adjusted under 35 U.S.C. 154(b) by 0 days.

(21) Appl. No.: 15/342,354

(22) Filed: Nov. 3, 2016

(65) Prior Publication Data
US 2017/0051867 A1 Feb. 23, 2017

Related U.S. Application Data

(63) Continuation-in-part of application No. 13/907,945, filed on Jun. 2, 2013, now Pat. No. 9,528,567, which
(Continued)

(51) Int. Cl.
*B60N 2/50* (2006.01)
*F16M 11/24* (2006.01)
(Continued)

(52) U.S. Cl.
CPC ............ *F16M 11/24* (2013.01); *B60N 2/501* (2013.01); *B60N 2/502* (2013.01); *B60N 2/505* (2013.01); *B60N 2/506* (2013.01); *B60N 2/508* (2013.01); *B60N 2/522* (2013.01); *B60N 2/527* (2013.01); *B60N 2/544* (2013.01); *B64D 11/06* (2013.01);
(Continued)

(58) Field of Classification Search
CPC ........ B60N 2/502; B60N 2/525; B60N 2/501; B60N 2/505; B60N 2/508; B60N 2/527; B60G 9/02; B60G 2204/129; F16F 9/53
See application file for complete search history.

(56) References Cited

U.S. PATENT DOCUMENTS 3,275,277 A * 9/1966 Illar ..................... B60N 2/502
188/266.5
3,406,983 A 10/1968 Masser
(Continued)

OTHER PUBLICATIONS

BPW Bergische Achsen, BPW axles with air suspension, Series 0/SL/AL, Installation instruction, BPW-EA-Luft 1023701e, Germany.
(Continued)

*Primary Examiner* — Bradley Duckworth
(74) *Attorney, Agent, or Firm* — Barnes & Thornburg LLP; Jeffrey R. Stone

(57) ABSTRACT

Various embodiments of the present technology may comprise a method and apparatus for a space-saving suspension system. In various embodiments, the apparatus may comprise a fine suspension device, a coarse suspension device, and a mechanical assembly. In various embodiments, the fine suspension device is arranged at an angle greater than zero degrees from the z-axis. In various embodiments, the mechanical assembly is coupled to the fine suspension device and a payload, such that when a force is exerted on the mechanical assembly by the payload, an applied force is transmitted to the fine suspension device.

19 Claims, 10 Drawing Sheets

Related U.S. Application Data is a continuation-in-part of application No. 13/854,102, filed on Mar. 31, 2013, now abandoned, which is a continuation of application No. 11/609,833, filed on Dec. 12, 2006, now Pat. No. 8,424,832, which is a continuation-in-part of application No. 11/278,642, filed on Apr. 4, 2006, now abandoned, said application No. 13/907,945 is a continuation-in-part of application No. 13/849,513, filed on Mar. 24, 2013, which is a continuation of application No. 12/620,510, filed on Nov. 17, 2009, now Pat. No. 8,424,885, which is a continuation-in-part of application No. 11/608,386, filed on Dec. 8, 2006, now Pat. No. 8,628,409, which is a continuation-in-part of application No. 11/317,414, filed on Dec. 22, 2005, now Pat. No. 7,461,849.

(60) Provisional application No. 60/669,225, filed on Apr. 6, 2005.

(51) Int. Cl.

| | | |
|---|---|---|
| *F16F 9/06* | (2006.01) | |
| *B60N 2/52* | (2006.01) | |
| *F16F 9/53* | (2006.01) | |
| *F41A 23/12* | (2006.01) | |
| *B60N 2/54* | (2006.01) | |
| *B64D 11/06* | (2006.01) | |
| *F16F 15/02* | (2006.01) | |
| *B60G 15/12* | (2006.01) | |
| *F41A 23/00* | (2006.01) | |

(52) U.S. Cl.
CPC ............ *B64D 11/0619* (2014.12); *F16F 9/06* (2013.01); *F16F 9/535* (2013.01); *F16F 15/02* (2013.01); *F41A 23/12* (2013.01); *B60G 15/12* (2013.01); *F16F 2222/12* (2013.01); *F16F 2232/08* (2013.01); *F41A 23/00* (2013.01)

(56) References Cited

U.S. PATENT DOCUMENTS

| | | | | |
|---|---|---|---|---|
| 4,284,161 | A | | 8/1981 | Blass |
| 4,309,045 | A | | 1/1982 | Raidel |
| 4,397,478 | A | * | 8/1983 | Jensen ................. B60G 11/465 267/31 |
| 5,080,389 | A | | 1/1992 | Kawano |
| 5,171,036 | A | | 12/1992 | Ross |
| 5,253,853 | A | * | 10/1993 | Conaway ........... B62D 33/0608 180/89.15 |
| 5,588,665 | A | | 12/1996 | Pierce |
| 5,651,585 | A | * | 7/1997 | Van Duser ............. B60N 2/502 248/585 |
| 5,785,341 | A | * | 7/1998 | Fenton ............... B62D 53/0821 267/35 |
| 5,975,508 | A | * | 11/1999 | Beard .................... B60N 2/501 180/89.12 |
| 6,082,715 | A | * | 7/2000 | Vandermolen ......... B60N 2/501 188/267.1 |
| 6,158,750 | A | * | 12/2000 | Gideon .................... B60G 7/02 267/281 |
| 6,220,587 | B1 | | 4/2001 | McKenzie |
| 6,398,243 | B1 | | 6/2002 | Hedenberg |
| 6,431,532 | B1 | * | 8/2002 | McKenzie ......... B62D 33/0608 267/256 |
| 6,527,287 | B2 | * | 3/2003 | Hedenberg ........... B60G 11/465 267/31 |
| 6,719,258 | B2 | * | 4/2004 | Bryngelson ............ B60N 2/502 248/419 |
| 7,066,448 | B2 | | 6/2006 | Thurm |
| 2007/0278723 | A1 | * | 12/2007 | Shoemaker ............ B60N 2/501 267/131 |
| 2008/0156602 | A1 | * | 7/2008 | Hiemenz .............. B60N 2/4242 188/267.1 |
| 2010/0044990 | A1 | * | 2/2010 | Woodbury, II .... B60G 17/0162 280/124.161 |

OTHER PUBLICATIONS

Tuthill Transport Technologies, Model 102AR Drive Axle Air-Ride Suspension System, Installation and Maintenance Instructions, United States.

SAF Holland, Drive-axle Air Suspension, Neway AD Series, white paper, United States.

\* cited by examiner

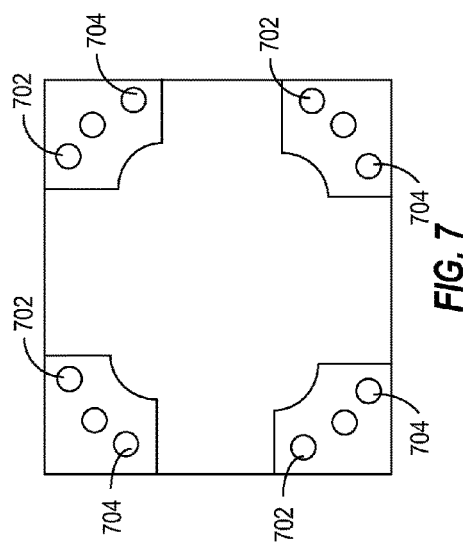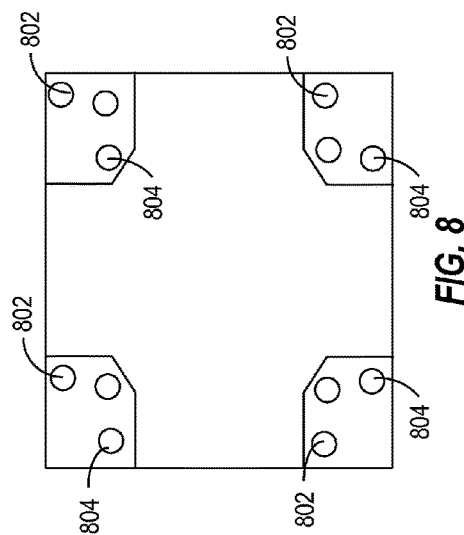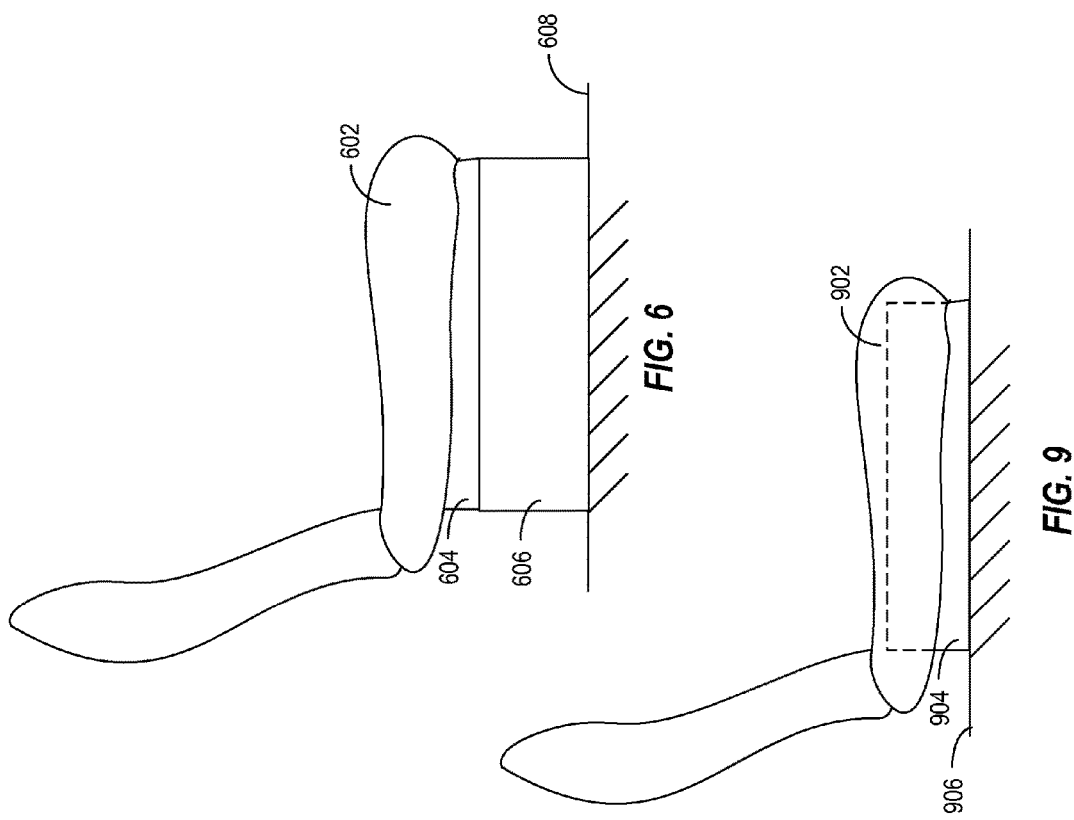

METHODS AND APPARATUS FOR A SUSPENSION SYSTEM

CROSS-REFERENCE TO RELATED APPLICATION

This application is a continuation-in-part of U.S. patent application Ser. No. 13/907,945 filed Jun. 2, 2013, which is a continuation-in-part of U.S. patent application Ser. No. 13/854,102, filed Mar. 31, 2013, which is a continuation of U.S. patent application Ser. No. 11/609,833, filed Dec. 12, 2006, which is a continuation-in-part of U.S. patent application Ser. No. 11/278,642, filed Apr. 4, 2006, which claims the benefit of U.S. Provisional Patent Application No. 60/669,225, filed Apr. 6, 2005, the contents of which are incorporated herein by reference in their entirety. U.S. patent application Ser. No. 13/907,945 filed Jun. 2, 2013, is also a continuation-in-part of U.S. patent application Ser. No. 13/849,513, filed Mar. 24, 2013, which is a continuation of application Ser. No. 12/620,510, filed Nov. 17, 2009, which is a continuation-in-part of application Ser. No. 11/608,386, filed Dec. 8, 2006, which is a continuation-in-part of application Ser. No. 11/317,414, filed Dec. 22, 2005, the contents of which are incorporated herein by reference in their entirety.

BACKGROUND OF THE TECHNOLOGY

Since the advent of the wheel, mobility has permeated most aspects of life. From the animal drawn buggies and carts of yesteryear, to today's most sophisticated transportation vehicles, literally hundreds of millions of people have come to depend on mobility in their everyday lives. Mobility provides faster, more efficient modes of operation, thus creating more productive work-related activities and more enjoyable recreational activities.

While the wheel remains one of the most widely used mechanisms to facilitate today's transportation, other transportation mechanisms, such as aerodynamic lift and jet propulsion, have also emerged. Generally speaking, all modes of transportation are derived from a need to transport a payload from one point to another.

In most instances, it is advantageous to reduce the amount of kinetic energy that is transferred to the payload, no matter what the payload may be. Substantial elimination of the transfer of road vibration to passengers in a motor vehicle, for example, may serve to minimize discomfort and/or injury, such as back pain, that may be caused by the road vibration. Furthermore, such a reduction may serve to increase the passengers' endurance during long road trips, while preserving energy once the destination has been reached.

Reduction in the amount of kinetic energy that is transferred to the vibration sensitive payloads during transport remains a high priority design criterion for virtually every mode of transportation. Current kinetic energy absorption solutions, however, tend to be largely ineffective, due in part to the inadequate level of shock absorption provided. Other kinetic energy absorption solutions may only offer a static level of kinetic energy absorption and are, therefore, incapable of providing shock absorption with respect to a changing environment.

In a mobile environment, however, a substantial portion of the acceleration forces exerted on the payload are time-varying acceleration forces, which render static kinetic energy absorption solutions largely ineffective. Efforts continue, therefore, to enhance shock absorption performance for virtually any payload and for virtually any type of mobile environment.

BRIEF DESCRIPTION OF THE DRAWINGS

A more complete understanding of the present technology may be derived by referring to the detailed description when considered in connection with the following illustrative figures. In the following figures, like reference numbers refer to similar elements and steps throughout the figures.

FIG. 6 representatively illustrates an application of a suspension system in accordance with an exemplary embodiment of the present technology;

FIG. 7 representatively illustrates components of a suspension system in accordance with an exemplary embodiment of the present technology;

FIG. 8 representatively illustrates components of a suspension system in accordance with an exemplary embodiment of the present technology;

FIG. 9 representatively illustrates an application of a suspension system in accordance with an exemplary embodiment of the present technology;

DETAILED DESCRIPTION OF EXEMPLARY EMBODIMENTS

Figure 1:
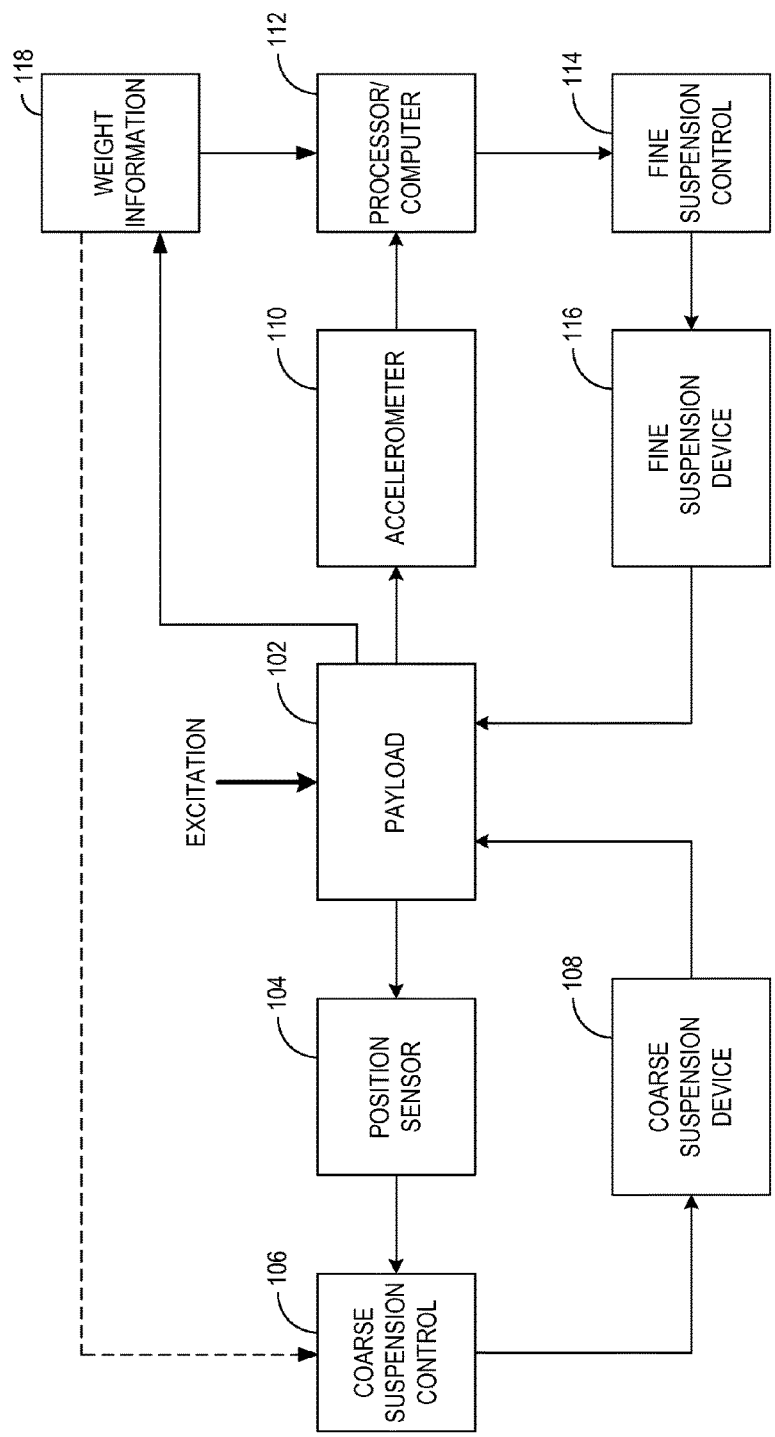
FIG. 1 representatively illustrates a functional block diagram of a suspension system in accordance with an exemplary embodiment of the present technology.

The present technology may be described in terms of functional block components and various processing steps. Such functional blocks may be realized by any number of components configured to perform the specified functions and achieve the various results. For example, the present technology may employ various electrical components, suspension devices, suspension platforms, couplings, assemblies, lever mechanisms, dampers, and the like, which may carry out a variety of functions. In addition, the present technology may be practiced in conjunction with any number of suspension systems where shock absorption is desired, such as automotive systems, aviation systems, and the like, and the suspension system described is merely one exemplary application for the technology.

Methods and apparatus for a space-saving suspension system according to various aspects of the present technology may operate in conjunction with any suitable mobile systems and/or acceleration damping applications.

Generally, the various embodiments of the present invention protect a payload in a mobile environment and/or a carrier from its shock/vibration-generating payload. Protection from kinetic energy transfer may be provided to assorted payloads in varying embodiments to protect the payload from potentially destructive acceleration forces. Protection from kinetic energy transfer may be provided to assorted carriers in varying embodiments to protect a carrier from potentially destructive acceleration forces being generated by a payload. The payload may comprise any object coupled to the suspension system where shock and/or vibration reduction is desired, such as a passenger seat (with or without a passenger), a trailer (with or without cargo), and the like. According to various embodiments, the suspension system may be implemented as a single or a multi-axis suspension system.

According to various embodiments, the suspension system may provide weight adaptation, such that a dynamic weight opposition force may be applied to maintain an equilibrium position of the payload. Thus, regardless of the weight of the payload, the equilibrium position of the payload may nevertheless be substantially maintained between a range of available positions.

Weight adaptation may also be implemented to control an optimal damper resistance of a damping device. For example, once a static weight of the payload is known (e.g., measured), a quiescent damper resistance based upon the static weight of the payload may be implemented. As the force applied by the weight of the payload changes (e.g., as positive or negative gravitational forces are exerted on the payload), the quiescent damper resistance of the damping device may increase or decrease based upon the changing force of weight being applied by the payload.

According to various embodiments, the suspension system may provide acceleration information, and a damper force may be dynamically adjusted in response to varying acceleration forces that may be imposed upon the payload. Components associated with the suspension system may include one or more accelerometers to monitor the acceleration forces. The suspension system may further include one or more processing modules that may be used to analyze the detected acceleration forces to determine the proper mode of reactionary control necessary to optimally dampen the detected acceleration forces.

The suspension system may, for example, be encapsulated within a single suspension platform, that when combined with a payload platform, may suspend a payload such that the payload "floats" along a substantially vertical axis with respect to a reference position. Alternatively, the suspension system may encapsulate multiple suspension platforms to suspend a payload above a reference position with multiple degrees of freedom. For example, multiple suspension platforms may suspend a payload such that the payload "floats" above a reference position and each suspension platform may operate independently or may be independently controlled, not only to reduce shock and vibration that may be transferred to the payload, but also to control and absorb longitudinal axis variations (e.g., roll variations), lateral axis variations (e.g., pitch variations) and vertical axis variations (e.g., yaw variations) that may be acting on the payload.

In an exemplary embodiment, the suspension system may be used to isolate passengers in a moving vehicle from potentially harmful kinetic energy transfer during vehicular motion. In particular, seats occupied by each passenger may be equipped with the suspension system, such that kinetic energy that would otherwise be transferred to the passengers may instead be absorbed/damped. Thus, by effectively shock mounting the passenger seats using the suspension system, the passengers may be substantially protected from varying acceleration forces that may be transferred to them as a result of vehicle movement.

The suspension system, such as a suspension platform, may be adapted for use with virtually any vehicular application (e.g., car, boat, truck, airplane, all-terrain vehicle, helicopter) in use today. The suspension platform may, for example, include pre-drilled mounting hardware that may allow the suspension platform to be fitted to a particular application. For example, an existing seat in virtually any existing vehicle may be removed from its mounting foundation and/or support mount, a suspension platform may be installed to the mounting foundation, and the seat may be mounted directly to the suspension platform. In such an embodiment, for example, the suspension platform may provide pre-drilled mounting configurations that may be compatible with both the mounting foundation of the vehicle as well as the mounting configuration of the seat.

In an alternative embodiment, the suspension system may be fitted within the interior of the seat. In such an embodiment, for example, no additional height is required to accommodate the suspension system, since the suspension system may fit substantially within the existing height profile of the seat.

In yet another embodiment, the suspension system may be fitted between a passenger compartment (e.g., a passenger cab of a semi-tractor truck) and the frame of a vehicle. In such an embodiment, the suspension system may absorb/dampen shock and vibration that would otherwise be transferred from the frame of the vehicle to the passenger compartment that is mounted to the frame of the vehicle. In addition, the suspension system may be fitted within each seat of the passenger platform to further reduce shock and vibration that may otherwise be transferred to the occupants of the vehicle.

In yet another embodiment, the suspension system may be fitted to a trailer, such that the suspension system may exist between the payload (e.g., the trailer) and the frame upon which the payload is mounted. In such an embodiment, the suspension system may provide suspension control substantially along a vertical axis, or may provide multi-axis control, such that the payload may be manipulated in multiple dimensions. Accordingly, not only may shock and vibration be absorbed/damped, but various components of the suspension system may reposition one or more portions of the payload so as to alter a center of gravity (CG) of the trailer. In so doing, for example, stability may be added (e.g., a reduction in the tendency of the trailer to jackknife or tip over may be realized). Such a suspension system may also be useful to redistribute the weight associated with a payload within airborne vehicles, so that control (e.g., adaptive control) of the CG of the aircraft may be adapted for safer flight (e.g., a CG of the aircraft may be repositioned toward the front of the aircraft and away from the rear of the aircraft to help prevent an unrecoverable stall configuration).

In other embodiments, the suspension system may reduce shock/vibration that may otherwise be transferred to the mounting foundation, support mount, carrier, or vehicle (i.e., a first element) by its shock/vibration producing payload. For example, a suspension system may be installed between a firing weapon (e.g., a submachine gun, a machine gun, cannon or other ammunition delivery system) and an associated mounting foundation. Accordingly, for example, forces exerted by the weapon onto the mounting foundation (e.g., a helicopter) may be absorbed/damped to reduce the forces that may otherwise be exerted onto the mounting foundation. In such an instance, an increase in the stability of the helicopter or reduction of vibration effects may be realized while the weapon is being fired. Suspension components may also be used to absorb/dampen recoil from the weapon, so as to provide greater control and accuracy to the operator of the weapon.

In each of the embodiments discussed above, various components of the suspension system may operate as a passive, a semi-active, or an active component. In a first mode of suspension control, coarse suspension control may be provided to effect a weight-bearing support, for example such that the magnitude of support that is provided may be adapted to the combined weight of the payload. For example, as a passenger is seated within an automobile seat, the coarse suspension control may adapt to the weight of the passenger by increasing the amount of opposing force that is necessary to maintain the position of the seat and the newly seated passenger within a coarse position range. Conversely, as a different passenger is seated on the seat, the coarse suspension control may adapt by automatically modifying the amount of opposing force that may be necessary to maintain the position of the seat and the newly seated passenger within the coarse position range.

In a second mode of suspension control, fine suspension control may be provided through a varying damper force, which may oppose movement and may seek to maintain a position of the payload within a fine position range. In various embodiments, the magnitude of the damper force may be set in response to a feedback control signal from, for example, a micro-electro mechanical system (MEMS) accelerometer measurement device. As such, the damper force may be increased in response to accelerometer feedback indicating a need for increased damper resistance. Conversely, the damper force may be decreased in response to accelerometer feedback indicating a need for decreased damper resistance.

The suspension system may utilize the accelerometer feedback to augment various components of the system through the use of processing modules that continuously monitor the accelerometer feedback signal. In such an instance, for example, signal processing may be employed to analyze both the time domain and frequency domain components of the accelerometer feedback signal in order to more accurately characterize the nature of the acceleration forces in real time. In addition, the suspension system may utilize the accelerometer feedback in conjunction with weight or mass information relative to the payload to establish a nominal damper resistance that may respond to the weight or mass of the payload for increased performance.

In various embodiments, any or all of the suspension components may be passive, such that they do not require an external power source and respond only to the motion of the payload and/or mounting foundation. In various embodiments, any or all of the suspension components may be active, such that they apply a force in real time to create a desired response (i.e., energy is added to system). In various embodiments, any or all of the suspension components may be semi-active, which modifies damping in real time, but are only dissipative and do not add energy to the system.

Referring to FIG. 1, an exemplary suspension system may support a second element (e.g., a payload 102), such as animate or inanimate objects, that may be subjected to varying acceleration forces, or excitations, as may be experienced in a mobile environment, such as in a motor vehicle or airplane. As discussed above, multiple modes of the suspension system may be implemented to substantially eliminate kinetic energy transfer to the payload 102.

In various embodiments, coarse suspension control may be effected to provide weight support to the payload 102. In particular, a position of the payload 102 may be detected by measuring the displacement of the payload 102 along a directional axis, e.g., in a vertical direction. In a first embodiment, a position sensor 104 may implement sensors (e.g., magnetic sensors) that may detect position excursions of the payload 102 relative to an equilibrium position of the payload 102.

In response to the detected position excursion, a coarse suspension control 106, operating on a coarse suspension travel axis, and a coarse suspension device 108 may combine to return the payload 102 to its equilibrium position. In a first embodiment, the coarse suspension device 108 may include a coiled energy spring having a variable spring constant k. A deflection below the equilibrium position of the payload 102 may be detected by the position sensor 104. As such, coarse suspension the control 106 may effect an increase in the spring constant k in response to the detected payload position, such that the position of the payload 102 may return to its equilibrium position due to the increased spring constant.

In an alternative embodiment, the coarse suspension device 108 may be implemented as a pneumatically controlled device, such as an air bladder, air piston, or a pneumatically controlled lift. Accordingly, the coarse suspension control 106 may comprise a pneumatically controlled device, such as an air compressor, or another source of compressed or contained air, which may either inflate or deflate the coarse suspension device 108 in response to a position control feedback signal emitted by the position sensor 104. In such an instance, weight adaptation may be implemented to maintain the payload 102 within a substantially fixed position range irrespective of the weight of the payload 102.

In other embodiments, the coarse suspension device 108 may comprise a mechanical spring, a hydraulic device, a magnetic device, an actuator, rack and pinion system, cable and pulleys system, counter-weight system with progressive weight adjustment, or any other suspension configured to provide weight bearing support.

In response to an excursion of the payload 102 below its equilibrium position, for example, the coarse suspension control 106 may cause a counteracting correction of the coarse suspension device 108. By virtue of the mechanical coupling between the payload 102 and the coarse suspension device 108, the position of the payload 102 may then be raised. In response to an excursion of the payload 102 above its equilibrium position, on the other hand, the coarse suspension control 106 may cause a counteracting correction of the coarse suspension device 108. By virtue of the mechanical coupling between the payload 102 and the coarse suspension device 108, the position of the payload 102 may then be lowered.

In various embodiments, fine suspension control may be effected to dampen kinetic energy transfer to the payload 102. An accelerometer 110 may be implemented to detect, and subsequently provide, an acceleration feedback control signal that is indicative of the time- and frequency-varying attributes of acceleration excitations being applied to payload 102. A processor/computer 112 may then continually analyze the acceleration feedback control signal to determine the nature of the acceleration forces being applied.

For example, the processor/computer 112 may apply a fast Fourier transform (FFT) to the acceleration feedback control signal to determine the spectral content of vibration that is generated by the acceleration excitations. As such, a fine suspension control 114 and a fine suspension device 116 may be adapted through the FFT analysis of the processor/computer 112 to provide wide vibration bandwidth isolation to the payload 102.

Harmonic components of vibration may also be analyzed to determine the time-varying characteristics of the vibration. In particular, the power spectra of the vibration may be analyzed using the FFT algorithm to determine signal strength in designated frequency bands (e.g., FFT bins) of the FFT output. A quantitative relationship between the vibration amplitude in the time domain and the associated spectral amplitude in the frequency domain may then be obtained to optimize the kinetic energy absorption performance of the fine suspension device 116.

For example, if the power spectra of the vibration are confined to relatively few FFT bins, then the acceleration excitation may be characterized as a steady state excitation having a sinusoidal property centered about a substantially constant frequency. As such, the fine suspension device 116 may be optimized to dampen vibration at the steady state excitation frequency by appropriate control of its damper force via the fine suspension control 114.

If the power spectra of the vibration is not confined to a relatively few FFT bins, but is rather spread across multiple FFT bins, then the acceleration excitation may instead be characterized as a step change in the payload 102 displacement, such as may be caused by driving over a pothole or speed bump. In such an instance, the damper force of the fine suspension device 116 may be optimized by the fine suspension control 114 for optimum damper force at fundamental and harmonic frequencies of vibration excitation. Once the vibration impulse is dampened, the fine suspension control 114 may return the fine suspension device 116 to a mode of operation as may be dictated by the acceleration feedback control signal.

In addition, the processor/computer 112 may continuously process FFT data to seek a quiescent mode of operation, such as to facilitate optimized kinetic energy absorption across a wide bandwidth of vibration excitation. For example, averaging of the FFT data may yield an optimized suspension control signal from the fine suspension control 114, such that the damper force of the fine suspension device 116 may be maintained at a nominal level between the steady state response and the step change response as discussed above.

Optimized suspension control in one embodiment means, for example, that the reaction time of the fine suspension device 116 is minimized according to the mode of operation. In particular, since the fine suspension device 116 may be programmed to exhibit a nominal damper force, the reaction time to achieve minimum or maximum damper resistance is essentially cut in half, assuming that the nominal damper force selected represents an average damper force across the entire dynamic range of damper force of the fine suspension device 116.

In addition, weight information 118 that is received by the processor/computer 112 from a manually programmed signal and/or from some other weight sensing device (e.g., an automatic weight sensor) that is indicative of the weight of the payload 102 may also be used to program the nominal damper resistance. In particular, performance of the fine suspension device 116 may be optimized by selecting a nominal damper resistance that may take into account the weight of the payload 102 as indicated by weight information 118. Weight information 118 may also be supplied to the coarse suspension control 106, so that an equilibrium position of the payload 102 may be maintained by the coarse suspension device 108 in response to a signal from the position sensor 104 and/or weight information 118.

In one embodiment, the fine suspension device 116 may be implemented as a magnetorheological (MR) device, which may incorporate MR fluid having a viscosity that may change in the presence of a magnetic field. As such, a viscosity change in the MR fluid may be effected by the presence of a magnetic field to increase/decrease the damper force of the fine suspension device 116.

In particular, the fine suspension control 114 may transmit a pulse width modulated (PWM) signal to a conductive coil (not shown) that surrounds the MR fluid contained within a housing of the MR device. The PWM signal parameters, such as duty cycle, may be modified in response to the analysis performed by the processor/computer 112 to adjust the damper force of the fine suspension device 116. Thus, the fine suspension control 114 may be defined as semi-active or active, since the control signal parameters to the MR device are modified in response to the analysis performed by the processor/computer 112.

Semi-active or active fine suspension control may be distinguished from static fine suspension control, which may be provided, for example, by a rheostat. Rheostats, for example, often employ a control knob, which may allow parameters of a control signal (e.g., a pulse width of a PWM modulated signal) that is provided to the MR device to be statically programmed in response to the knob position. After that, the parameters of the control signal remain static and do not change regardless of the analysis performed by an accelerometer and/or a processor/computing element.

Thus, a static fine suspension control system may be fixed in its settings or only be responsive to a control setting. A semi-active or active fine suspension control may improve upon statically controlled fine suspension systems in a mobile environment, since acceleration forces may be time varying, thus potentially requiring a dynamically controlled damper resistance. Accordingly, by fitting a static fine suspension control mechanism with the semi-active or active fine suspension control, improvements to the static control system may be realized.

Weight information 118 may, for example, be set via a rheostat to enhance the performance of the fine suspension device 116 and/or the coarse suspension control 106. In particular, the weight of the payload 102 may be reflected via the weight information signal emitted by the rheostat, such that the weight information signal emitted by the rheostat is related to the weight of the payload 102. Alternatively, weight information 118 may be provided by a weight sensing device that may automatically and continuously measure a weight of the payload 102 and provide the weight information to the processor/computer 112 and/or the coarse suspension control 106.

By increasing the duty cycle of the PWM signal in response to a control signal, the fine suspension control 114 may impart an increased magnitude of time varying current to the coil of an MR device, which in turn may impart an increased magnetic field around the MR fluid of the MR device. In response, the damper forces exerted by the fine suspension device 116 may increase to react to dynamically changing acceleration forces. Conversely, by decreasing the duty cycle of the PWM signal in response to the control signal, the fine suspension control 114 may impart a decreased magnitude of time varying current to the coil of an MR device, which in turn may impart a decreased magnetic field around the MR fluid of the MR device. In response, the damper forces exerted by the fine suspension device 116 may decrease in response to the control signal.

If weight information 118 is utilized by the processor/computer 112, then the fine suspension control 114 may command the fine suspension device 116 to a nominal damper resistance that may respond to the weight of the payload 102 as indicated by weight information 118. In particular, the fine suspension control 114 may set the duty cycle of the PWM signal, at least in partial response to weight information 118, to impart a magnitude of time varying current to the coil that may be related to at least the weight of the payload 102. As such, the nominal damper resistance of the fine suspension device 116 may be set at least in partial response to the weight of the payload 102.

Figure 2:
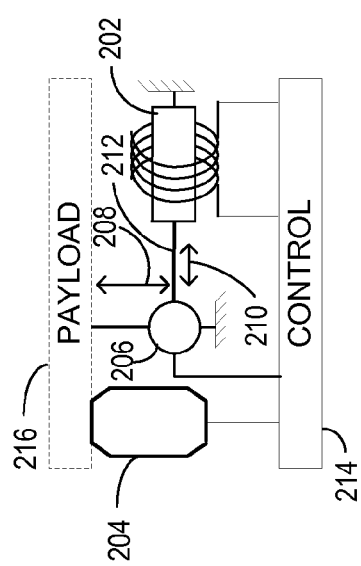
FIG. 2 representatively illustrates a schematic diagram of a suspension module in accordance with an exemplary embodiment of the present technology.
Figure 12:
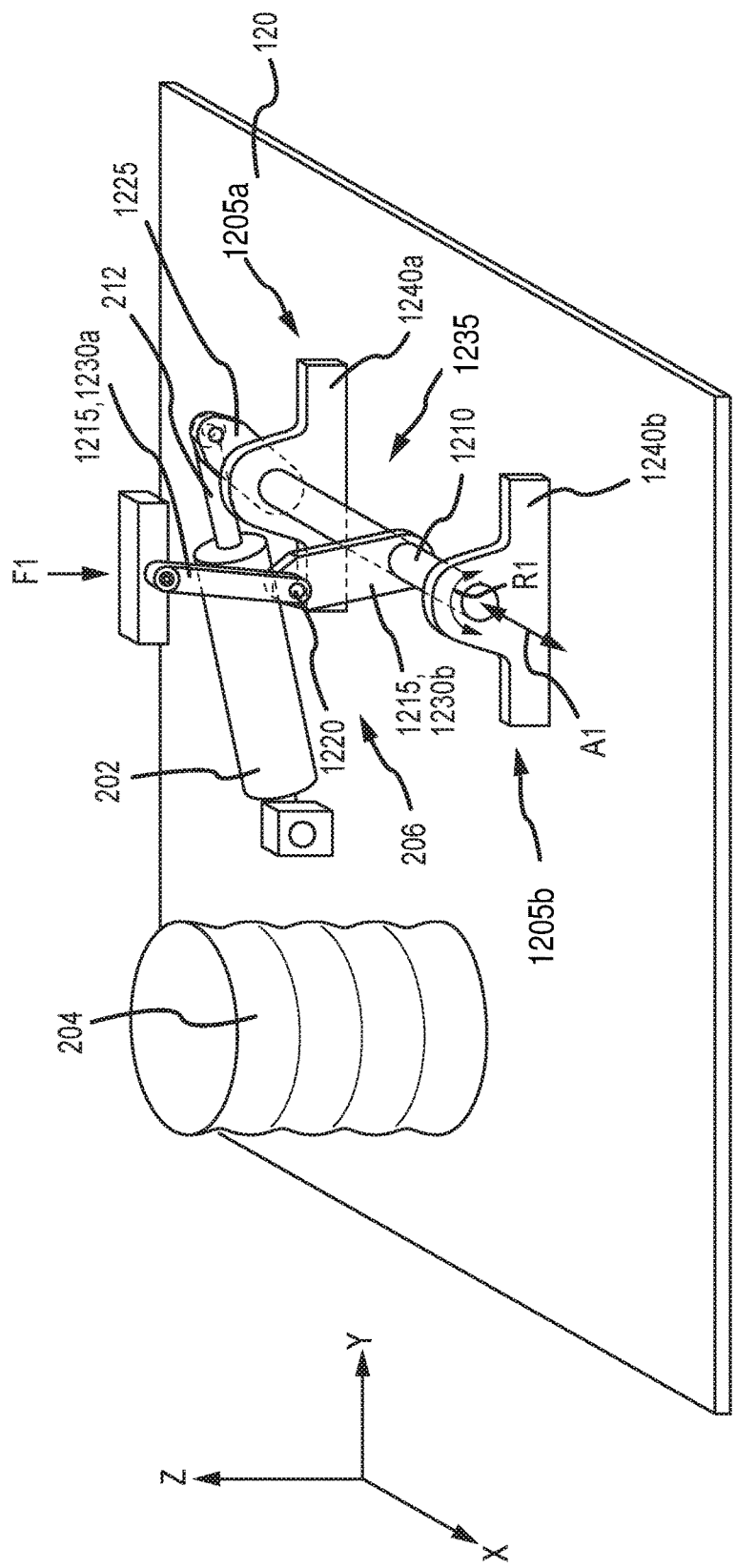
FIG. 12 representatively illustrates a perspective view of a space-saving suspension system in accordance with an exemplary embodiment of the present technology.

Referring to FIG. 2, in an exemplary embodiment, a space-saving suspension system may be used in suspension systems tailored for applications where space along a particular axis (e.g., a vertical axis) may be conserved. Components of the suspension system may be arranged in a space-saving configuration to minimize an amount of space that is occupied between a payload 216 and a support mount 120 (FIG. 12) to provide a fixed surface and/or attachment point for the space-saving suspension system, such as a mounting platform, a mounting point, a mounting foundation, a mounting frame, and the like.

The payload 216 may comprise a load associated with any number of suspension applications, such as a passenger seat of a vehicle, a passenger compartment of a vehicle, a payload of a trailer or container, a mount for equipment, and/or a platform for an equipment operator. The suspension system absorbs/damps shock and vibration, for example to minimize shock and vibration transfer to the payload 216.

In various embodiments, the vertical position of the payload 216 may be adjusted through actuation of a coarse suspension device 204. In an exemplary embodiment, the coarse suspension device 204 may comprise a pneumatically controlled device, such as an air bladder, air piston, air spring or a pneumatically controlled lift. In alternative embodiments, the coarse suspension device 204 may comprise a mechanical spring, a hydraulic device, a magnetic device, an actuator, a rack and pinion system, a cable and pulley system, a counter-weight system with progressive weight adjustment, or any other suspension system configured to provide weight bearing support.

The space-saving suspension system may further comprise a fine suspension device 202 to operate in conjunction with the coarse suspension device 204. In various embodiments, the fine suspension device 202 may provide shock and/or vibration absorption and/or damping of a force exerted along a directional vector 208 (e.g., along a z-axis), and may comprise a damper, such as an MR suspension device, a gas filled shock, an air piston damper, a fluid filled damper, a hybrid gas and fluid filled damper, an electromagnetic damper, a linear actuator, and the like. In various embodiments, the fine suspension device 202 may comprise a piston 212 to compress gas or fluid contained within the fine suspension device 202. In various embodiments, the space-saving suspension system may comprise a flexible air reservoir (not shown) to store excess air within in the system. For example, the air reservoir may be coupled to the pneumatic device to store excess air from the pneumatic device.

The fine suspension device 202 may be mounted in a space-saving fashion (e.g., substantially horizontally as shown) and may operate in a space-saving fashion (e.g., substantially horizontally as shown), such that movement of payload 216 along an axis 208 (i.e., a first axis) may result in actuation of the fine suspension device 202 along a fine suspension travel axis. For example by utilizing a mechanical assembly 206, the fine suspension device 202 may operate along a different axis 210 (i.e., a second axis). In various embodiments, the fine suspension travel axis is arranged at an angle greater than zero from the coarse suspension travel axis.

The coarse suspension device 204 may maintain an equilibrium position of the payload 216 such that a position of the piston 212 may be substantially centered between a minimum and a maximum throw position of the piston 212. Accordingly, since the coarse suspension device 204 may substantially center the throw of the piston 212, a mechanical assembly 206 coupled between the payload 216 and the fine suspension device 202 may be optimized throughout the entire movement range of the payload 216 so as to substantially avoid the end-stop limits of the piston 212 (e.g., the piston 212 may be substantially prevented from reaching its maximum or minimum extension limits).

According to various embodiments, the fine suspension device 202 may be coupled to the payload 216 via the mechanical assembly 206. The mechanical assembly 206 may translate forces along one axis (e.g., along the vertical z-axis) into forces along a different axis, such that the fine suspension device 202 may absorb/dampen the forces while operating along the different axis via the mechanical assembly 206. In various embodiments, the mechanical assembly 206 may transfer applied forces from the support mount 120 and/or the payload 216 to other components of the suspension system, such as the fine suspension device 202. Accordingly, for example, a height profile of the suspension system may be reduced by allowing the fine suspension device 202 to be mounted in a space-saving fashion (e.g., in a non-vertical orientation) as well as allowing the fine suspension device 202 to operate in a space-saving fashion (e.g., in a non-vertical orientation) during operation.

In various embodiments, the mechanical assembly 206 is provided in a space-saving fashion. In the present embodiment, the mechanical assembly 206 is oriented in a manner that minimizes the amount of vertical space required between the payload 216 and the support mount 120. Other embodiments may utilize different configurations of the suspension components, for example to minimize space in non-vertical orientations. In various embodiments the support mount 120 is illustrated as a horizontal plane support, while in other embodiments the support mount 120 may have a non-horizontal orientation and/or may have a non-planar attachment.

In one embodiment, the mechanical assembly 206 may comprise a right-angle gear drive (not shown) to translate movement of the payload 216 along the first axis 208 into movement of the piston 212 substantially along the second axis 210. In various embodiments, any angle of rotation may be accommodated by the mechanical assembly 206, such that any movement of the payload 216 along one axis may be translated into a movement of the piston 212 from 0 degrees to 180 degrees with respect to that axis. The angle of rotation may depend on the location of the mechanical assembly 206, the space for operation, and any other suitable criteria.

In various embodiments, the mechanical assembly 206 may comprise any number of levers, linkage points, couplings and configurations of such components. Various configurations of the mechanical assembly 206 may operate to alter resistance forces. For example, the length of a levers and position of a linkage points or other fulcrum may affect the amount of force needed to effect movement of the lever.

The mechanical assembly 206 may provide varying gear ratios that may augment operation of the fine suspension device 202. For example, a gear ratio of the right-angle gear drive of the mechanical assembly 206 may be provided such that movement along the first axis 208 may be translated into a movement of the piston 212 that relates to the gear ratio of the right angle gear drive. Accordingly, for example, the throw of the piston 212 along the horizontal axis 210 may be less than, equal to, or greater than the proportionate deflection of the payload 216 along the first axis 208 due to the gear ratio as provided by the right angle gear drive.

In various embodiments, the suspension system may comprise a scissor linkage (not shown) comprising two pivotally interconnected links. In an exemplary embodiment, the suspension system may comprise two sets of scissor linkages arranged on opposing sides of the surface mount 120. The scissor linkage is a secondary support that functions as a guide for the vertical motion of the payload 216 and/or support mount 120. The scissor linkage may provide some nominal damping effects.

The suspension system may comprise the control unit 214 to control various devices in response to external forces and/or stimuli. In an exemplary embodiment, the control unit 214 may comprise a pneumatically controlled device, such as an air compressor, or another source of compressed air, which may either inflate or deflate the coarse suspension device 204 in response to a position control feedback signal emitted by a position sensor (not shown). In such an instance, weight adaptation may be implemented to maintain the payload 216 within a substantially fixed position range regardless of the weight of the payload 216. In various embodiments, a clutch device (not shown) may be actuated by the control unit 214 such that a multitude of gear ratios may be selected within the mechanical assembly 206 as may be required by a particular application.

The control unit 214 may further comprise compressors, position sensors, weight information devices and the like, such that the desired position of the payload 216 may be maintained through appropriate actuation of the coarse suspension device 204. In response to an excursion of the payload 216 below its equilibrium position, for example, the control unit 214 may cause a counteracting correction of the coarse suspension device 204. By virtue of the mechanical coupling between the payload 216 and the coarse suspension device 204, the position of the payload 216 may then be raised. In response to an excursion of the payload 216 above its equilibrium position, on the other hand, the control unit 214 may cause a counteracting correction of the coarse suspension device 204. By virtue of the mechanical coupling between the payload 216 and the coarse suspension device 204, the position of the payload 216 may then be lowered.

In various embodiments, the control unit 214 may comprise a processor/computer 112 (FIG. 1) adapted to minimize kinetic energy transferred to payload 216. An accelerometer 110 (FIG. 1) may be implemented to detect, and subsequently provide, an acceleration feedback control signal that is indicative of the time and frequency-varying attributes of acceleration excitations being applied to payload 216.

The processor/computer 112 may continually analyze the acceleration feedback control signal to determine the nature of the acceleration forces being applied. The control unit 214 may then provide an appropriate control signal to the fine suspension device 202 in response to the analysis performed. The control unit 214 may similarly provide an appropriate control signal to the fine suspension device 202 to maintain a nominal magnitude of damper resistance that responds the weight of payload 216. Weight information may be provided by the control unit 214 via a static control (e.g., a rheostat), or via automatic control (e.g., a weight sensing device). The control unit 214 may also provide an appropriate control signal to the coarse suspension device 204 to, for example, center the payload 216 within an optimal throw position of the piston 212. The control unit 214 may also provide an appropriate control signal to the mechanical assembly 206 to change a gear ratio as provided by the mechanical assembly 206.

In operation, referring to FIGS. 2 and 12-15, coarse position control may be implemented by the coarse suspension device 204 to maintain an equilibrium position of payload 216 with respect to the support mount 120 along the first axis 208. In one embodiment, the coarse suspension device 204 comprises a pneumatic device, comprising a first and second end, arranged parallel to both the first axis 208 and a z-axis, wherein the first end is coupled to the support mount 120 and the second end is coupled to the payload 216. The z-axis may be defined according to a conventional 3-dimensional coordinate system.

The fine suspension device 202 may operate along an axis that is separated from and/or not parallel to the first axis 208, such as by being mounted in a non-vertical orientation. The fine suspension device 202 may be coupled to the mechanical assembly 206, wherein the fine suspension device 202 and mechanical assembly 206 are positioned between the payload 216 and the support mount 120 to reduce the vertical relationship between the payload 216 and the support mount 120.

Actuation of the fine suspension device 202 alters the resistance and/or travel of the movement of the piston 212 along a range of stroke whose direction may range between one that is orthogonal to the first axis 208 and one that is substantially parallel to the first axis 208. An upward movement of the payload 216, for example, may cause the piston 212 to extend. In response, the right-angle gear drive of the mechanical assembly 206 may rotate, thereby extending the piston 212. However, the movement of the piston 212 is resisted by the damper force exerted by the associated gas or fluid surrounding the piston 212. As such, an upward movement of the payload 216 is resisted by the piston 212 through rotational actuation of the mechanical assembly 206.

A downward movement of the payload 216, on the other hand, may cause the piston 212 to contract. In response, the right-angle gear drive of the mechanical assembly 206 may rotate counter-clockwise, thereby contracting the piston 212. However, the movement of the piston 212 is resisted by the damper force exerted by the associated gas or fluid surrounding the piston 212 as discussed above. As such, a downward movement of the payload 216 is resisted by the piston 212 through rotational actuation of the right-angle gear drive of the mechanical assembly 206.

In various embodiments, the space-saving suspension system may operate as a passive system. Other embodiments, however, may operate as a semi-active system or active system. Configuration and/or operation as a passive system, semi-active system, or active system may be selected according to any suitable criteria, such as the application of the fine suspension device 202 and/or the type of the coarse suspension device 204.

In various embodiments, the mechanical assembly 206 may comprise a bearing system 1235 to operate in conjunction with the fine suspension device 202 and coarse suspension device 204. The bearing system 1235 may be suitably configured to provide mechanical operation and movement of the fine suspension device 202 and other components coupled to the bearing system 1235. The bearing system 1235 may comprise a bearing 1205 comprising a bearing element (not shown) attached to a bearing housing 1240, for example a pillow block bearing, and a shaft 1210. The bearing 1205 and bearing housing 1240 may be suitably configured to bear fiction, for example friction from the shaft 1210. In an exemplary embodiment, the bearing system 1235 may comprise a first bearing 1205a, and a second bearing 1205b, with a first bearing housing 1240a and a second bearing housing 1240b, respectively, supporting the shaft 1210. The shaft 1210 may be coupled between and supported by the bearings 1205a, 1205b, and may rotate about a common axis A1 in a rotational direction R1.

Figure 13:
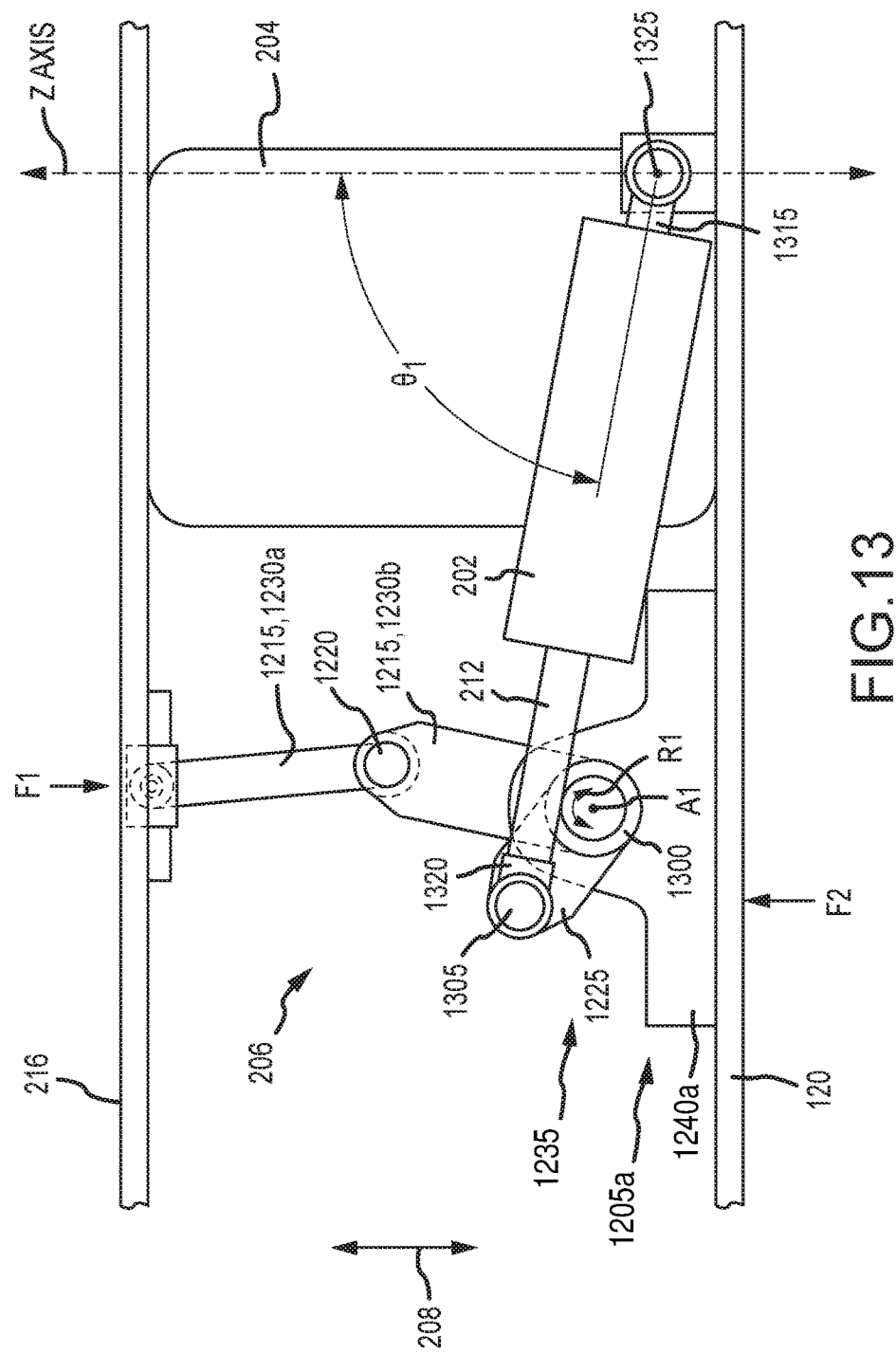
FIG. 13 representatively illustrates a side view of a space-saving suspension system in accordance with an exemplary embodiment of the present technology.
Figure 15:
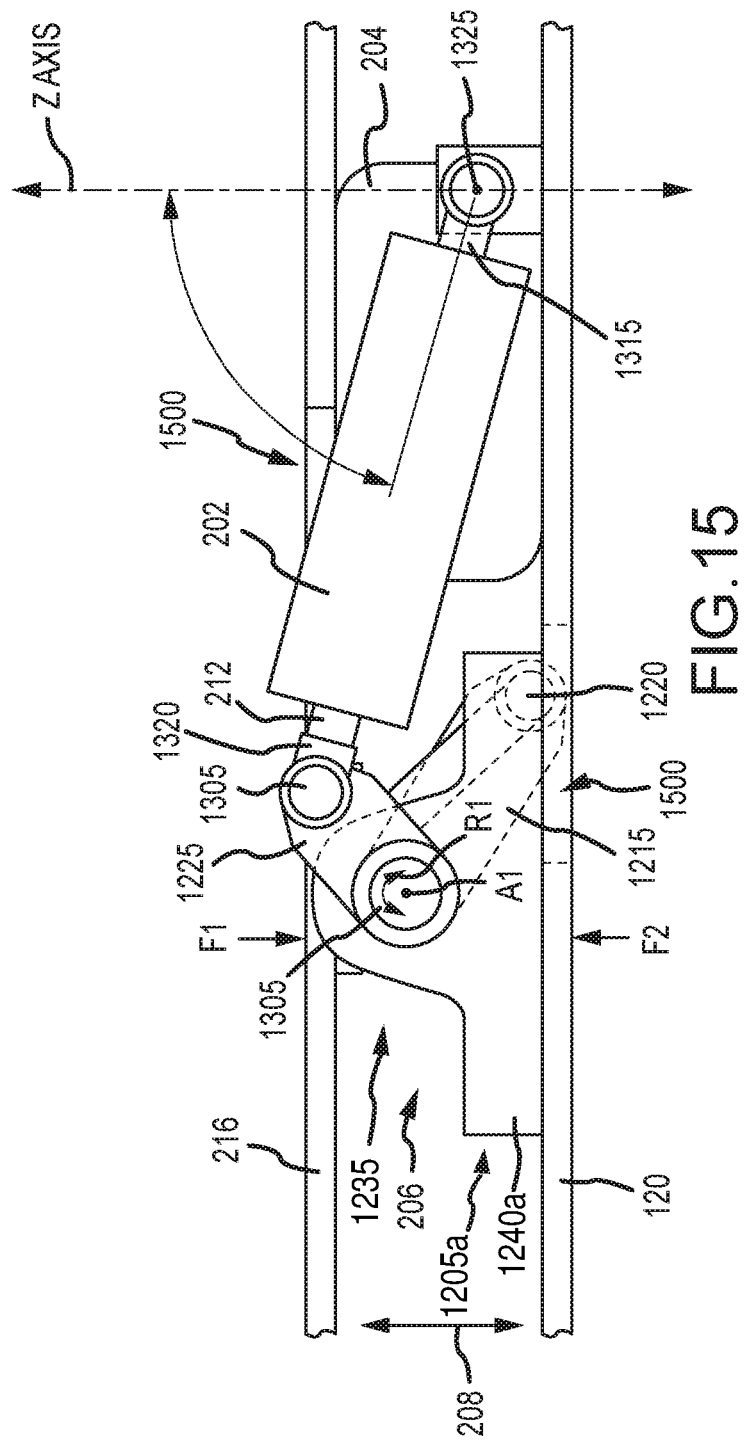
FIG. 15 representatively illustrates a side view of a space-saving suspension system in accordance with an exemplary embodiment of the present technology.

In various embodiments, the mechanical assembly 206 may further comprise a lever arm 1215 to redirect and alter various forces applied to the space-saving suspension system. For example, referring to FIG. 12, the lever arm 1215 may be fixed to the shaft 1210 of the bearing system 1235 to redirect various forces to the bearing system 1235 by effecting movement of the bearing system 1235. The lever arm 1215 may comprise an upper segment 1230a and a lower segment 1230b coupled together with a hinge 1220. The hinge 1220 may provide a movable joint such that the lever arm 1215 bends (folds) and straightens at the hinge 1220 with movement along the first axis 208. The upper segment 1230a and the lower segment 1230b together may effect a torque on the bearing system 1235. The length of the upper and lower segments 1230b, 1230b of the lever arm 1215 may be selected according to a particular application, for example to select a range of travel at the top of the lever arm 1215. Referring to FIGS. 13 and 15, the hinge 1220 may allow the lever 1215 to bend (fold) from an extended position to a compressed position.

In the present embodiment, the mechanical assembly may further comprise a lever 1225 to operate in conjunction with the lever arm 1215 and/or to redirect and alter various forces applied to the space-saving suspension system. The lever 1225 may couple the bearing system 1235 to the fine suspension device 202. For example, referring to FIG. 13, the lever 1225 may comprise a first end 1300 and a second end 1305. The first end 1300 of the lever 1225 may be affixed to the shaft 1210 such that as the shaft 1210 rotates about the common axis A1, and the lever 1225 also rotates in the same direction. The second end 1305 may couple to the fine suspension device 202.

Various configurations of the mechanical assembly 206 may operate to alter resistance forces. For example, the length of the lower segment 1230b of the lever arm 1215 and the length of the lever 1225 may be varied and may affect the amount of force applied to the fine suspension device 202. The ratio of the lower segment 1230b and the length of the lever 1225 may be defined as a lever ratio.

Referring still to FIG. 13, the fine suspension device 202 of the present exemplary embodiment may comprise a first end 1315 and a second end 1320. The first end 1315 of the fine suspension device 202 may be pivotably coupled to the support mount 120, such that the fine suspension device 202 pivots about an axis 1325. The fine suspension device 202 may be coupled to the bearing system 1235 via the lever 1225. In an exemplary embodiment, the second end 1320 of the fine suspension device 202, for example the piston 212, may be coupled to the second end 1305 of the lever 1225 via a movable linkage.

The fine suspension device 202 may have an angle of rotation θ, defined by the angle created from a maximum position of the fine suspension device 202 to a minimum position of the fine suspension device 202. For example, the maximum position may be defined as a first angle $\theta_1$ measured from the z-axis. In the present embodiment, the z-axis is perpendicular to the support mount. In the present embodiment, the maximum position is achieved when the suspension system is fully extended, as illustrated in FIG. 13. The minimum position may be defined as a second angle $\theta_2$ measured from the z axis. In this case, the minimum position is achieved when the suspension system is in a partially compressed position, as illustrated in FIG. 14 As such, the angle of rotation θ is equal to the difference of the first angle $\theta_1$ and the second angle $\theta_2$ (i.e., $\theta = \theta_1 - \theta_2$).

Referring to FIG. 15, in various embodiments, the support mount 120 and the payload 216 may be configured with openings 1500 to allow the lever arm 1215 and the fine suspension device 202 to pass through the openings 1500 in the fully compressed position.

The various components may be configured to operate in any appropriate direction. For example, in alternative embodiments, the portions of the mechanical assembly 206, such as the bearing system 1235, and fine suspension device 202 may be mounted to an underside of the support mount 120 or to a second mounting location below the support mount 120, with the lever arm 1215 passing through or above the support mount 120.

Figure 14:
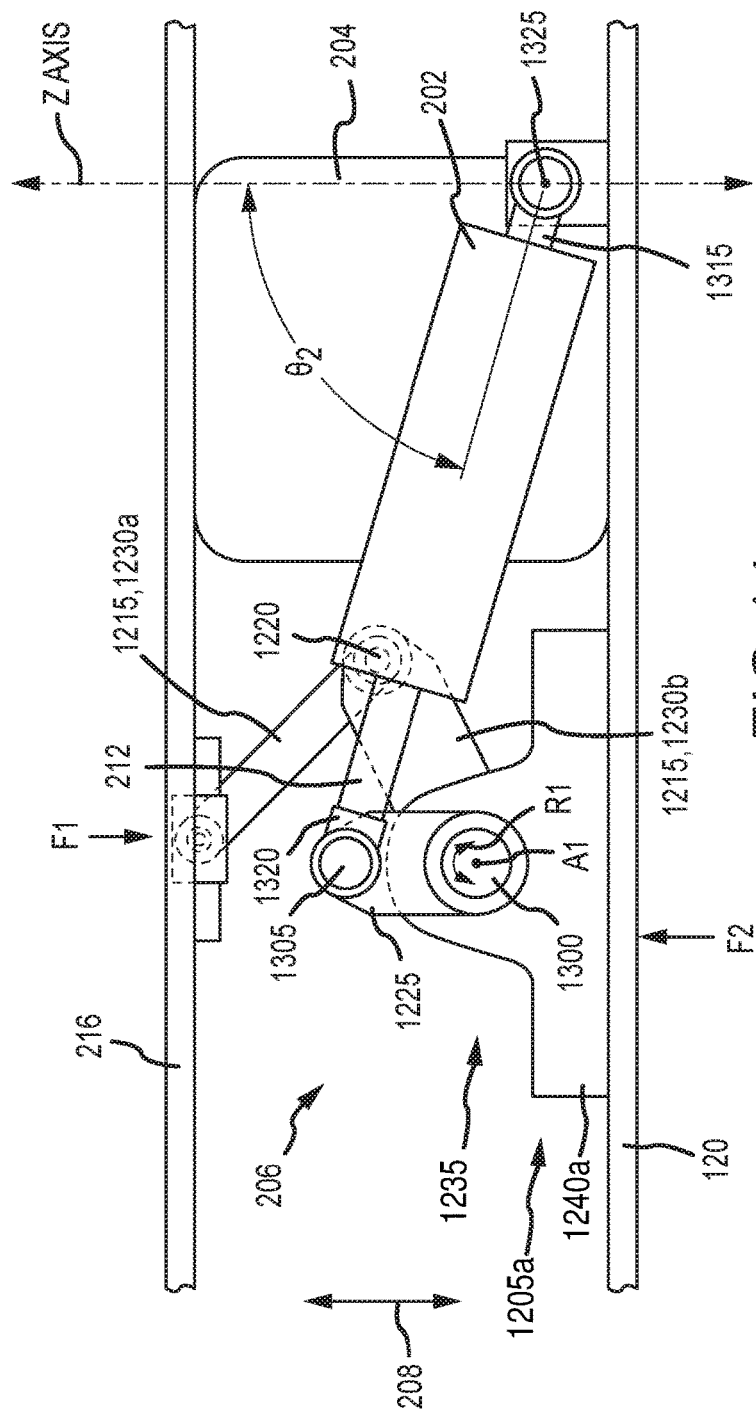
FIG. 14 representatively illustrates a side view of a space-saving suspension system in accordance with an exemplary embodiment of the present technology.

Referring to FIGS. 13 through 15, in operation, the space-saving suspension system may fluctuate between the fully extended position (FIG. 13) and a fully compressed position (FIG. 15). Movement and/or vibrations of the support mount 120 may apply forces along the first axis 208 and may result in an upward force F2 (i.e., in the positive z direction). Simultaneously, a downward force F1 (i.e., in the negative z direction), may be applied by the payload 216 as a mass and/or acceleration along the first axis 208.

When the suspension system is in the fully extended position and either one of the upward force F2 or the downward force F1 is applied, the mechanical assembly 206 begins to move toward the compressed position. Specifically, as the upward force F2 is applied, the lever arm 1215 begins to bend at the hinge 1220, and at the same time, the lower segment 1230b of the lever arm 1215 rotates the shaft 1210 along the rotational direction R1 in a clockwise direction. The rotation of the shaft 1210 causes the first and second ends 1300, 1305 of the lever 1225 to rotate clockwise. As the lever 1225 rotates clockwise, the piston 212 of the fine suspension device 202 is compressed.

Extension of the piston 212 of the fine suspension device 202 occurs with an opposing movement of the mechanical assembly 206. As the piston 212 extends, the lever 1225 and shaft 1210 rotate along rotational direction R1 in a counter-clockwise direction.

Figure 3:
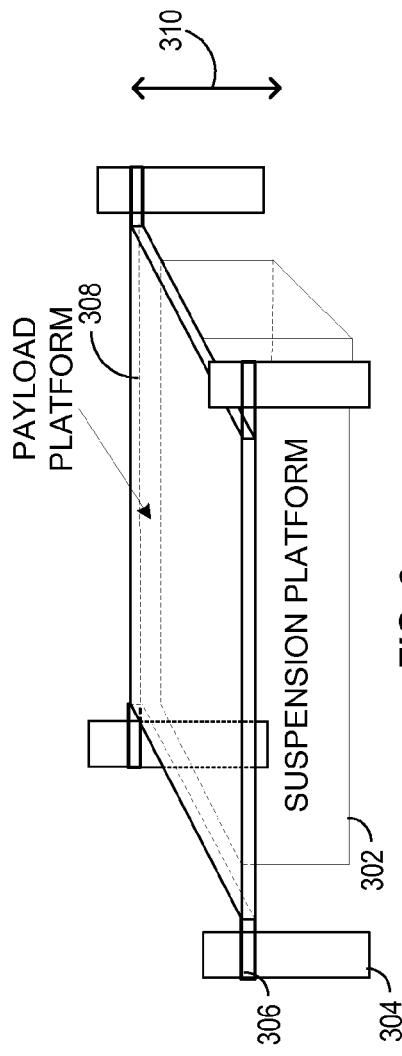
FIG. 3 representatively illustrates a suspension system in accordance with an exemplary embodiment of the present technology.

Referring to FIG. 3, in an exemplary embodiment, the suspension system may comprise a payload platform 308 and a plurality of movable couplings 306. A payload (not shown) may be mechanically supported by the payload platform 308 and the movable couplings 306 (e.g., one movable coupling located at each corner of the payload platform 308) may include linear bearings, such that the payload may be supported by a suspension platform 302. The linear bearings of the movable couplings 306 may track vertically along an outer frame 304 to maintain the payload in a laterally fixed relationship with respect to the outer frame 304. The laterally fixed relationship may be maintained while the payload moves along an axis 310 as shock and vibration forces are absorbed/damped by the suspension platform 302.

The suspension platform 302 may adjust the vertical position of the payload (not shown) as supported by the payload platform 308. Accordingly, inflating pneumatically controlled devices of a suspension platform 302 (e.g., one or more the coarse suspension devices 204) may cause the payload to track upward along the axis 310, while the lateral relationship with respect to the outer frame 304 is maintained by the movable couplings 306. Conversely, deflating pneumatically controlled devices of the suspension platform 302 (e.g., one or more the coarse suspension devices 204) may cause the payload to track downward along the axis 310, and the lateral relationship with respect to the outer frame 304 is maintained by the movable couplings 306.

Figure 4:
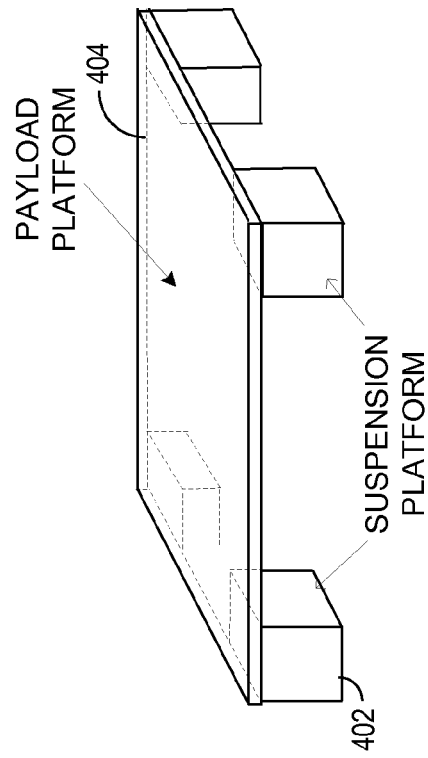
FIG. 4 representatively illustrates a suspension system in accordance with an exemplary embodiment of the present technology.

The suspension system may comprise multiple suspension platforms. For example, referring to FIG. 4, multiple suspension platforms 402 may be positioned under a payload platform 404 (e.g., a suspension platform 402 located under each corner of payload platform 404). Each suspension platform 402 may include any number of suspension components (e.g., the suspension components of FIG. 2) such that each suspension platform 402 may independently absorb/dampen/control position variations of the payload platform 404 and the payload (not shown) being supported by the payload platform 404.

Accordingly, for example, the payload platform 404 and associated payload (not shown) may be subjected to control inputs provided by the suspension platforms 402 such that longitudinal, lateral, and/or vertical forces that may be acting upon the payload platform 404 and associated payload may be absorbed/damped. In so doing, the suspension platforms 402 may act independently to invoke roll, pitch, and yaw control inputs to the payload platform 404 that may be effective not only to control a three-dimensional displacement of the payload platform 404 and associated payload, but also to damp/absorb vibration and shock excitation that may be imposed upon the payload along the longitudinal, lateral and/or vertical axes relative to the payload.

Figure 5:
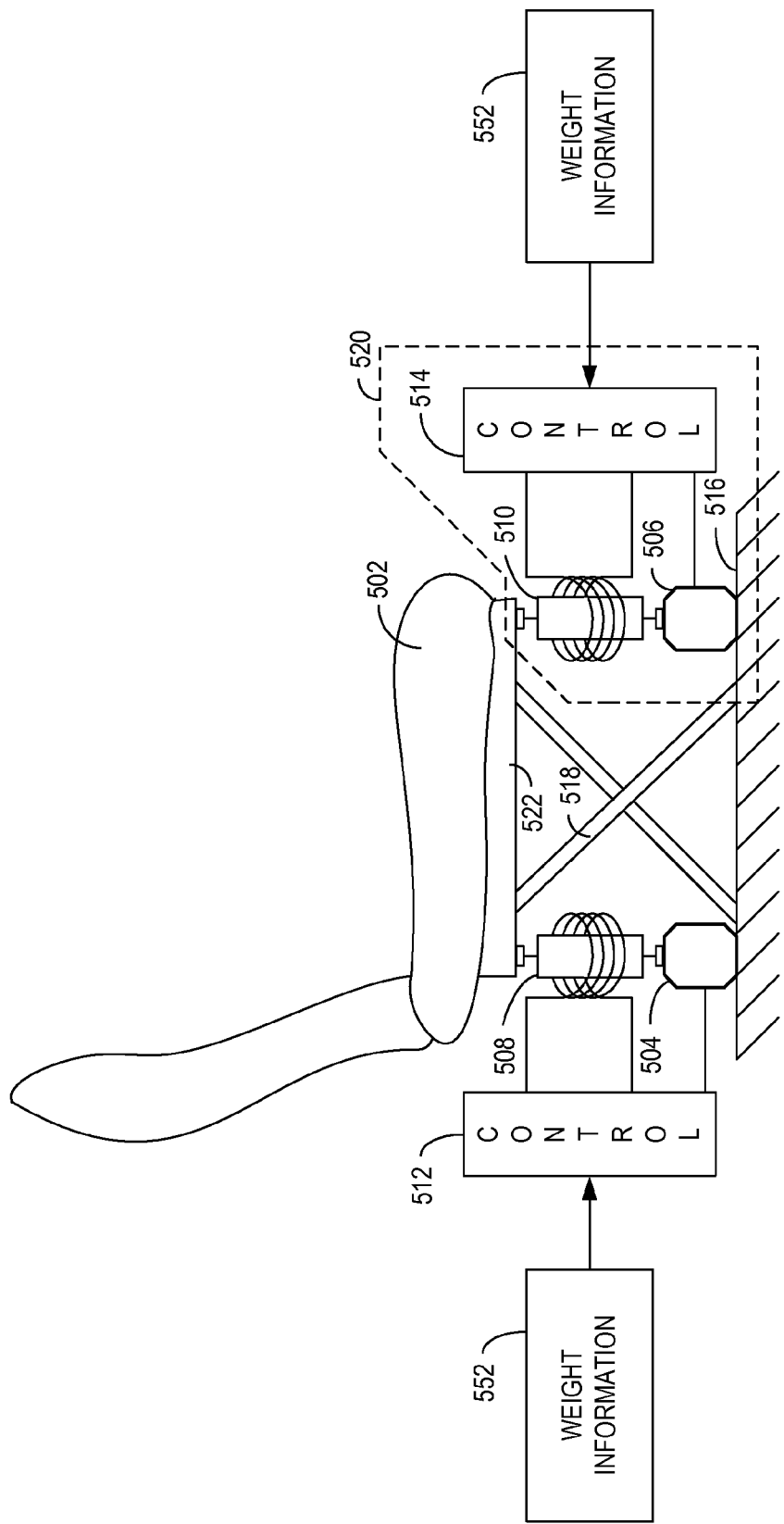
FIG. 5 representatively illustrates an application of a suspension system in accordance with an exemplary embodiment of the present technology.

Referring to FIG. 5, in one embodiment of the suspension system, the payload may include a passenger seat 502, as well as the passenger (not shown), such as within a vehicle or airborne transport mechanism. One or more suspension platforms 520 (e.g., four suspension platforms 520) may be combined with other support systems, such as a support structure 518, for added programmability of the seat 502 position. The suspension devices 504-510 may be installed vertically, or may be angled to facilitate a given implementation. Furthermore, any placement of the suspension devices 504-510 (e.g., device pairs 504/508 and 506/510 placed in parallel with each other, respectively, or device pairs 504/508 and 506/510 placed in series with each other, respectively) along the seat frame 522 and a platform 516 may be implemented as required to facilitate a given implementation.

The vertical position of the seat 502 may be adjusted through actuation of the coarse suspension devices 504 and/or 506. The coarse suspension devices 504, 506 may comprise, for example, coiled energy springs having fixed or variable spring constants k. Alternatively, the coarse suspension devices 504 and/or 506 may comprise pneumatic devices, such as an air bladder, air piston, air spring, or pneumatically controlled lift. In other embodiments, the coarse suspension devices 504, 506 may comprise a hydraulic device, magnetic device, actuator, rack and pinion system, cable and pulleys system, counter-weight system with progressive weight adjustment, or any other suspension configured to provide weight bearing support.

The control blocks 512 and/or 514 may include compressors, position sensors, and the like, such that the commanded position of the seat 502 may be maintained through appropriate actuation of the coarse suspension devices 504 and/or 506 regardless of the weight of the passenger seat 502 and passenger (not shown).

The commanded position of the passenger seat 502 may be substantially horizontal to the platform 516 by maintaining the coarse suspension devices 504, 506 at substantially the same inflation level. Alternatively, a slightly reclined position may be maintained, without sacrifice to kinetic energy absorption capability, by inflating the forward coarse suspension device 506 to a slightly higher level as compared to the rear coarse suspension device 504. It can be seen that a multitude of adjustment configurations (e.g., adjustment configurations along the longitudinal, vertical and lateral axes) may be enhanced using multiple suspension platforms 520 without suffering a loss of kinetic energy absorption capability.

In various embodiments, the pneumatically controlled devices 504 and/or 506 may act in conjunction with the fine suspension devices 508 and/or 510. In various embodiments, the fine suspension devices 508, 510 may comprise a damper to provide shock and/or vibration absorption and/or damping, such as an MR suspension device, a gas filled shock, an air piston damper, a fluid filled damper, a hybrid gas and fluid filled damper, an electromagnetic damper, a linear actuator, and the like.

Since the fine suspension devices 508 and/or 510 maintain mechanical coupling with passenger seat 502 throughout the entire adjustment range of passenger seat 502, the operation of the suspension devices 508 and/or 510 are unaffected by the adjustment of the passenger seat 502. For example, the fine suspension devices 508 and/or 510 may substantially eliminate kinetic energy transfer to the passenger seat 502 (and associated passenger), regardless of the configured position of the passenger seat 502.

In various embodiments, the control blocks 512 and/or 514 may comprise an accelerometer (e.g., the accelerometer 110 of FIG. 1), a processor (e.g., the processor/computer block 112 of FIG. 1), and fine suspension control (e.g., the fine suspension control 114 of FIG. 1) to dampen kinetic energy transfer to the passenger seat 502. The control blocks 512 and/or 514 may be implemented to detect accelerations, and subsequently provide an acceleration feedback control signal that is indicative of the time-varying attributes of acceleration excitations being applied to the passenger seat 502.

The control 512 and/or 514 may continually analyze the acceleration feedback control signal to determine the nature of the acceleration forces being applied. The control blocks 512 and/or 514 may then provide an appropriate control signal to the coarse suspension devices 504 and/or 506, respectively, in response to the analysis performed by the control 512 and/or 514. The control blocks 512 and/or 514 may similarly provide an appropriate control signal to the fine suspension devices 508 and/or 510, respectively, to maintain a nominal magnitude of fine suspension damper resistance that responds to the weight of the passenger seat 502 (and associated passenger) as provided by weight information 552. Weight information 452 may be provided by a manually programmed rheostat, a weight sensing device, etc.

Turning to FIGS. 6, 7 and 8, an alternative embodiment, the suspension systems described above may be fitted to operate in conjunction with an existing design of a passenger seat in a vehicle. For example, suspension platforms 606 may be fitted under an existing passenger seat of virtually any vehicle. The suspension system may, for example, be a single suspension platform (e.g., single suspension platform 302 of FIG. 3, or the suspension system of FIG. 12), or the suspension platform 606 may be multiple suspension platforms (e.g., the four suspension platforms 402 of FIG. 4 mounted at each corner of seat base 604).

The suspension platform 606 may, for example, include a universal mounting configuration (e.g., the mounting configuration of FIG. 7), such that the universal mounting configuration may be compatible with a foundation 608 of virtually any vehicle. For example, the mounting configuration 702 of a first side of the suspension platform 606 may be compatible with the opposing mounting configuration arranged on the foundation 608 of a first make of a vehicle, the mounting configuration 704 of the first side of the suspension platform 606 may be compatible with the opposing mounting configuration arranged on the foundation 608 of a second make of a vehicle, and so on.

Similarly, the suspension platform 606 may include a universal mounting configuration (e.g., the mounting configuration of FIG. 8), such that the universal mounting configuration may be compatible with a seat base 604 of virtually any vehicle seat. For example, the mounting configuration 802 of a second side of the suspension platform 606 may be compatible with the opposing mounting configuration arranged on the seat base 604 of a first make of a vehicle seat, the mounting configuration 804 of the second side of the suspension platform 606 may be compatible with the opposing mounting configuration arranged on the seat base 604 of a second make of a vehicle seat, and so on.

Referring to FIG. 9, an alternative embodiment of the suspension system may comprise one or more suspension platforms 904 fitted within the interior of an existing passenger seat design of virtually any vehicle. Suspension platform 904 may, for example, be a single suspension platform (e.g., single suspension platform 302 of FIG. 3) or multiple suspension platforms (e.g., four suspension platforms 402 of FIG. 4, for example mounted at within each corner of seat 902).

Suspension platform 904 may be inserted substantially within an interior profile of seat 902, such that a distance (e.g., a vertical distance) between seat 902 and foundation 906 is minimized. Such an embodiment may be beneficial, for example, for those vehicle applications where space under seat 902 may be limited (e.g., under the seat of a Porsche 911).

Figure 10:
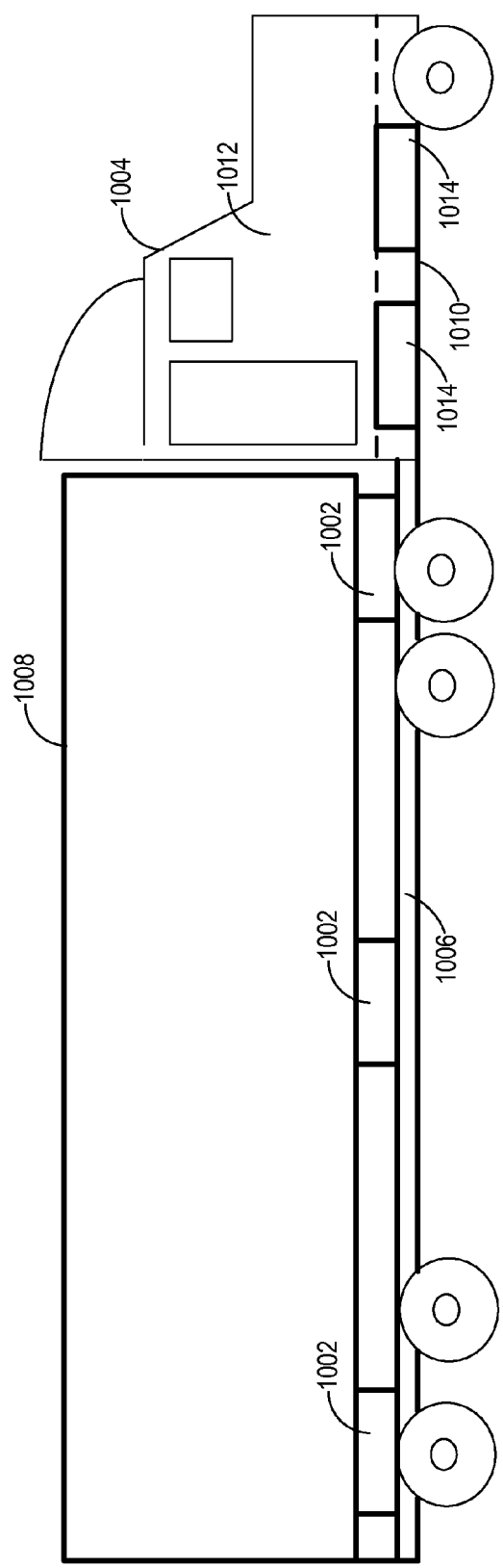
FIG. 10 representatively illustrates an application of a suspension system in accordance with an exemplary embodiment of the present technology.

Referring to FIG. 10, in an alternative embodiment, the suspension systems of a tractor trailer and the like, may be fitted to operate as a space-saving suspension system. For example, the space-saving suspension system and/or suspension platforms 1002 may be placed between a mounting frame 1006 and a trailer 1008 to provide shock/vibration protection for cargo (not shown) within the trailer 1008. The suspension system and/or suspension platforms 1002 may, for example, include multiple space-saving suspension systems and/or suspension platforms (e.g., four suspension platforms 402 of FIG. 4 mounted at each corner between the mounting frame 1006 and the trailer 1008 and a fifth suspension platform 402 of FIG. 4 mounted at a midpoint between the mounting frame 1006 and the trailer 1008). The suspension system may operate in conjunction with pneumatic controls that may otherwise be associated with the suspension systems and/or suspension platforms 1002 (e.g., air compressors), and/or in conjunction with a source of compressed air that may already be available within the pneumatic systems of a tractor 1004.

In addition to providing shock/vibration protection, suspension platforms 1002 may combine to provide a stability control mechanism. For example, the suspension systems and/or suspension platforms 1002 may operate to counteract dynamic forces that may cause the trailer 1008 to become unstable (e.g., tip over due to a shifting weight of cargo contained within the trailer 1008). For example, should a downward force be applied to one side of the trailer 1008 (e.g., from a shifting cargo weight on that side of the trailer 1008 caused by a tight turn), the adaptive pneumatic control associated with one or more of the suspension platforms 1002 on that side of the trailer 1008 may first detect the increased weight and/or detect a downward shift in the displacement on that side of the trailer 1008 and may operate to increase a ride height associated with that side of the trailer 1008 to compensate for the downward shift. In addition, the pneumatic control associated with one or more of the suspension platforms 1002 on the opposite side of the trailer 1008 may also detect a decreased weight and/or detect an upward shift in the displacement of the opposite side of the trailer 1008 and may cause the ride height of the opposite side of the trailer 1008 to decrease in order to compensate for the upward shift. As a result, the suspension system and/or suspension platforms 1002 may interoperate to cause the trailer 1008 to "push back" against, or oppose, the force that may otherwise cause the trailer 1008 to become unstable (e.g., cause the trailer 1008 to jackknife and/or tip over).

One or more suspension systems and/or suspension platforms 1014 may, for example, be placed between a mounting frame 1010 and a cab 1012 of the tractor 1004. The suspension systems and/or suspension platforms 1014 may, for example, comprise multiple space-saving suspension systems and/or platforms (e.g., one or more suspension platforms 402 of FIG. 4 mounted between the mounting frame 1010 and a cab 1012 of the tractor 1004). The suspension systems may operate in conjunction with pneumatic controls associated with the suspension system and/or suspension platforms 1014 (e.g., air compressors), and/or a source of compressed air that may already be available within the pneumatic systems of the tractor 1004. Accordingly, shock/vibration that may otherwise be transferred from the mounting frame 1010 to the cab 1012 may instead be substantially absorbed/damped by the one or more suspension systems and/or suspension platforms 1014.

In addition, the adaptive pneumatic controls associated with the suspension systems and/or the suspension platforms 1014 may provide additional stability for the cab 1012. Longitudinal stability (e.g., roll stability) may, for example, be provided under conditions (e.g., road conditions) that may cause the right or left portions of the mounting frame 1010 to raise or lower, which may be detected by the adaptive pneumatic control of the suspension systems and/or the suspension platforms 1014 to compensate by lowering or raising the right or left portions, respectively, of the cab

1012. As a result, a tendency of the mounting frame 1010 to roll from side to side may be offset by establishing a counteracting roll of the cab 1012 by the suspension systems and/or suspension platforms 1014 to maintain the cab 1012 substantially level along the longitudinal axis.

Similarly, lateral stability (e.g., pitch stability) may, for example, be provided under conditions (e.g., road conditions) that may cause the front or back portions of the mounting frame 1010 to raise or lower, which may be detected by the adaptive pneumatic control of the suspension systems and/or the suspension platforms 1014 to compensate by lowering or raising the front or back portions, respectively, of the cab 1012. As a result, a tendency of the mounting frame 1010 to pitch fore or aft may be offset by establishing a counteracting pitch of the cab 1012 by the suspension systems and/or the suspension platforms 1014 to maintain the cab 1012 substantially level along the lateral axis. The suspension systems and/or the suspension platforms 1014 and associated functionality may be placed between the mounting frame and passenger compartment of virtually any vehicle, such as a recreational vehicle, car, bus, boat, airplane, and the like.

In an alternative embodiment, the suspension system and/or the suspension platform may, for example, include a single space-saving suspension system and/or suspension platform (e.g., suspension platform 302 of FIG. 3 operable to support the full weight of the trailer 1008 on the payload platform 308). For example, the trailer 1008 may rest upon a payload platform (e.g., payload platform 308) and may be supported by a suspension platform (e.g., suspension platform 302), while the trailer 1008 may be allowed to "float" above the frame 1006 via the movable couplings (e.g., the movable couplings 306) and the associated linear bearings (not shown) of the movable couplings. Substantially all of the shock/vibration that may otherwise be transferred from the mounting frame 1006 to the trailer 1008 may instead be absorbed/damped by the suspension platform (e.g., suspension platform 302) while the trailer 1008 may be allowed to gently move in a substantially vertical direction (e.g., along the directional vector 310). Alternatively, the suspension system of FIG. 12 may operate to support the trailer 1008 (i.e., the payload 216) on the support mount 120.

Figure 11:
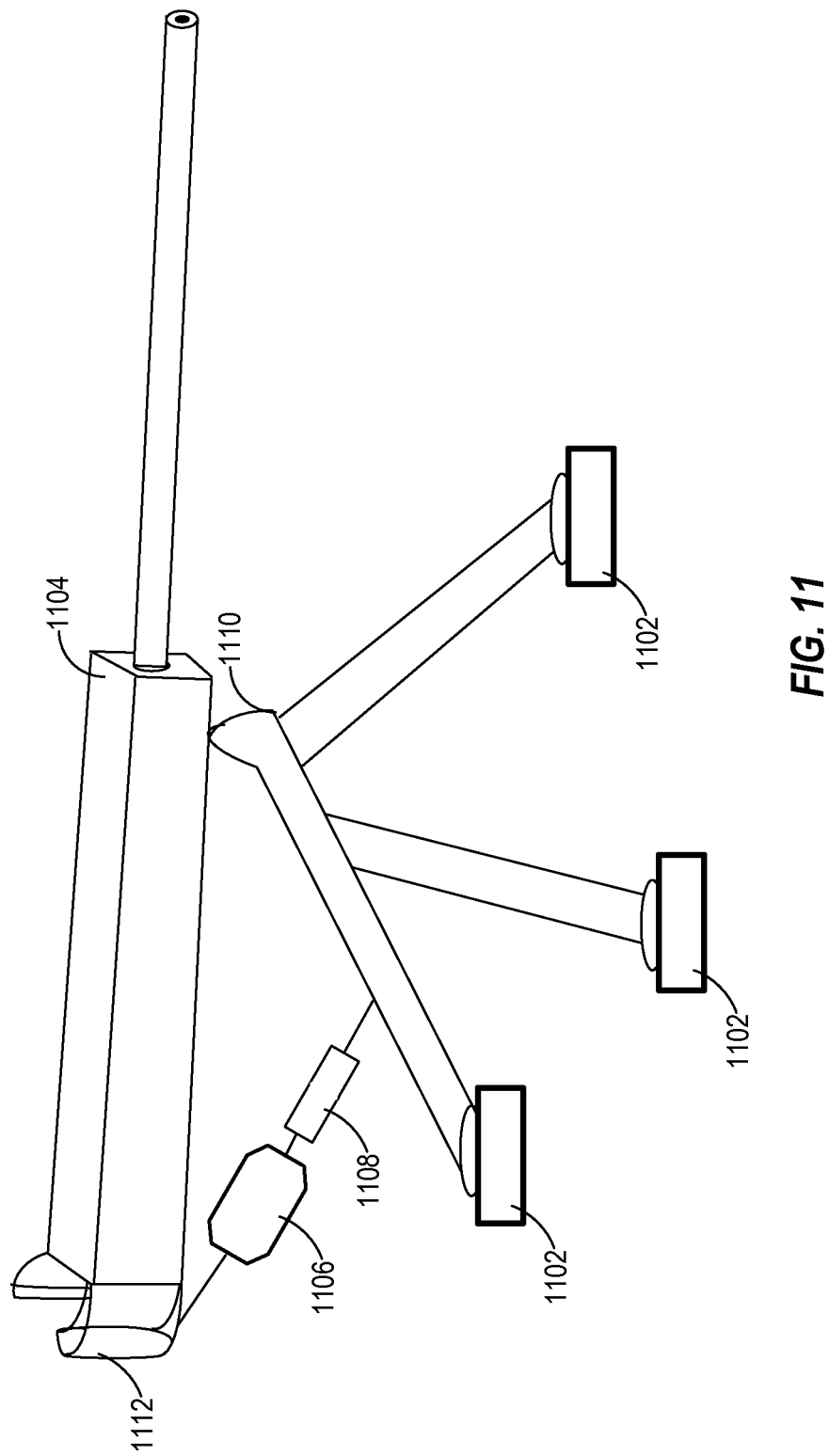
FIG. 11 representatively illustrates an application of a suspension system in accordance with an exemplary embodiment of the present technology.

Referring to FIG. 11, an alternative embodiment of the suspension system may comprise one or more space-saving suspension systems and/or suspension platforms 1102 placed between a shock/generating device (e.g., a machine gun 1104) and a mount (not shown). The suspension system may, for example, comprise multiple space-saving suspension platforms (e.g., the suspension platform 402 of FIG. 4 mounted under each leg of a tripod 1110) or a single suspension platform (e.g., the suspension platform 302 where each leg of the tripod 1110 is mounted to the payload platform 308). Alternatively, the suspension system may, for example, comprise the space-saving suspension system of FIGS. 12-15 configured as a multiple suspension system or a single suspension system.

The suspension platform(s) 1102 may, for example, substantially isolate the mounting platform (e.g., a machine gun bay of a military helicopter) from the shock and vibration generated by the machine gun 1104 as it is being fired, such as from an aerial position afforded by a helicopter or other vehicle. Accordingly, any recoil forces that may otherwise be transferred to the vehicle by the machine gun 1104 may instead be substantially absorbed/damped by the suspension system and/or suspension platform 1102. As a result, greater stability may be afforded to the vehicle while the machine gun 1104 is being fired, since a substantial portion of the recoil forces may be absorbed/damped by the suspension system and/or suspension platform 1102 rather than being transferred to the vehicle (e.g., displace the helicopter from its flight path due to the recoil forces generated by the machine gun 1104).

Additional shock/vibration isolation may be generated by a first component 1106 (e.g., a pneumatic device) and/or a second component 1108 (e.g., an MR device) along with the associated control components (not shown). In particular, any recoil forces generated by the machine gun 1104 that may otherwise be transferred to the operator (not shown) of the machine gun 1104 via a handle 1112 may instead be absorbed/damped by the first and second components 1106, 1108. As a result, greater accuracy of fire may be afforded due to a substantial portion of the recoil forces being absorbed/damped before they are allowed to affect aiming stability as facilitated by the handle 1112.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A suspension apparatus for use with a payload movable with respect to a support mount along a vertical axis, comprising:
   a fine suspension device comprising a first and second end, wherein:
      the first end is configured to be pivotably coupled to the support mount;
      the fine suspension device operates along a fine suspension axis; and
      the fine suspension axis is not parallel to the vertical axis;
   a mechanical assembly comprising:
      a rotatable bearing system coupled to the second end of the fine suspension device and configured to be directly coupled to the support mount;
      a lever arm comprising an upper segment rotatably coupled to a lower segment, wherein:
         the lower segment is affixed to the bearing system; and
         the upper segment is configured to be coupled to the payload; and
      a coarse suspension device arranged to operate parallel to the vertical axis and coupled between the support mount and the payload.

2. The suspension apparatus of claim 1, wherein the lever arm comprises a hinge coupling the upper and lower segments.

3. The suspension apparatus of claim 1, wherein the fine suspension device comprises at least one of: a gas shock, a liquid-filled damper, and a gas and liquid-filled damper.

4. The suspension apparatus of claim 1, wherein the coarse suspension device comprises a pneumatic device.

5. The suspension apparatus of claim 4, further comprising an air reservoir coupled to the pneumatic device.

6. The suspension apparatus of claim 1, wherein the bearing system comprises a rotatable shaft engaging a bearing.

7. The suspension apparatus of claim 1, wherein the lower segment is rotatably coupled to the fine suspension device by a lever coupling the bearing system to the fine suspension device.

8. The suspension apparatus of claim 1, further comprising a scissor linkage coupled between the payload and the support mount.

9. The suspension apparatus of claim 1, wherein the fine suspension device comprises a magnetorheological damper.

10. A suspension system for coupling between a support mount and a payload, comprising:
    a fine suspension device comprising:
       a first end configured to be pivotably coupled to the support mount; and
       a piston extending from a second end;
       wherein the fine suspension device is arranged at an angle from a z-axis, and
       wherein the angle is greater than zero degrees;
    a mechanical assembly configured to be coupled to the payload, the support mount, and the second end of the fine suspension device, the mechanical assembly comprising:
       a bearing system comprising:
          a bearing comprising a bearing housing configured to be directly coupled to the support mount; and
          a shaft, wherein the shaft is rotatable upon the bearing;
       a hinged lever arm affixed to the shaft;
       a lever coupling the shaft to the piston; and
       wherein the mechanical assembly transfers an applied force from at least one of the support mount and the payload to the fine suspension device; and
    a pneumatic device comprising a first and second end, wherein the first end is coupled to the support mount and the second end is coupled to the payload.

11. The suspension system of claim 10, wherein the fine suspension device comprises at least one of a gas damper, a liquid-filled damper, and a gas and liquid-filled damper.

12. The suspension system of claim 10, wherein the pneumatic device comprises an air spring.

13. The suspension system of claim 10, wherein the hinged lever arm comprises an upper segment and a lower segment, wherein the lower segment is coupled to the shaft and the upper segment is coupled to the payload.

14. The suspension system of claim 10, further comprising a scissor linkage coupled between the payload and the support mount.

15. The suspension system of claim 10, further comprising an air reservoir coupled to the pneumatic device.

16. The suspension system of claim 10, wherein the fine suspension device is movably coupled to the lever.

17. A method for damping movement, comprising:
    absorbing energy along a first axis with a pneumatic device;
    transferring energy along a second axis at a non-zero angle to the first axis utilizing a fine suspension device and a mechanical assembly, the mechanical assembly comprising:
       a rotatable shaft coupled to a bearing;
       a hinged lever arm comprising an upper segment and a lower segment, wherein the upper segment and lower segment are coupled at a hinge point, and the lower segment is fixed to the rotatable shaft; and wherein the hinged lever arm is configured to fold; and
       a lever coupled to the shaft and the fine suspension device;
    wherein transferring energy along the second axis comprises:
       rotating the shaft by applying a torque on the shaft with the hinged lever arm and simultaneously folding the hinged lever arm at the hinge point; and
       compressing the fine suspension device with the lever simultaneously as the shaft rotates, wherein the fine suspension device:
          pivots about a fixed point on the support mount to form an angle of rotation; and
          the fine suspension device resists compression.

18. The method of claim 17, further comprising adapting a height of the pneumatic device based on a weight of the payload.

19. The method of claim 17, further comprising adapting a height of the pneumatic device in response to a position sensor indicating a position of the payload.

* * * * *